United States Patent [19]

Simkin

[11] 3,950,892
[45] Apr. 20, 1976

[54] FREEZE DRYING OF SEEDS
[75] Inventor: Joseph Simkin, Lafayette Hill, Pa.
[73] Assignee: Pennwalt Corporation, Philadelphia, Pa.
[22] Filed: Dec. 3, 1974
[21] Appl. No.: 529,191

Related U.S. Application Data
[63] Continuation-in-part of Ser. No. 487,472, July 11, 1974, which is a continuation of Ser. No. 324,926, Jan. 19, 1973, abandoned.

[52] U.S. Cl. .................................. 47/58; 47/DIG. 9; 426/385
[51] Int. Cl.$^2$ ...................... A23C 1/06; A01C 1/00
[58] Field of Search ........... 426/384–385, 524; 34/5; 47/58, DIG. 9

[56] References Cited
UNITED STATES PATENTS

| | | | |
|---|---|---|---|
| 1,846,510 | 2/1932 | Busse | 47/58 |
| 3,228,838 | 1/1966 | Rinfret et al. | 426/384 X |
| 3,239,942 | 3/1966 | Mink et al. | 426/384 X |
| 3,462,849 | 8/1969 | Gidlow | 34/5 |
| 3,466,756 | 9/1969 | Tooby | 34/5 |

*Primary Examiner*—Robert E. Bagwill

[57] ABSTRACT

The process of freeze-drying vegetable, farm-crop, and flower seeds to increase storage life and germination rate of the seeds.

12 Claims, No Drawings

FREEZE DRYING OF SEEDS

This is a continuation-in-part of prior copending application Ser. No. 487,472 filed July 11, 1974 which is a continuation of prior application Ser. No. 324,926 filed Jan. 19, 1973, now abandoned.

This invention concerns a process for improving the storage life of seeds by reducing their moisture content using freeze-drying techniques.

The biological deterioration rate of seeds kept in storage is greatly influenced by the water content of the seeds. The first indication of this deterioration or aging of seeds generally is an inability to germinate or a slower growth, and less resistance to attack by microorganisms, these conditions often referred to as "loss of vigor". An attempt to prolong the viability of seeds by water removal therefrom is very often accompanied by irreparable tissue damage. Current practices used by horticulturists to prepare seeds for storage by decreasing the water content involve holding the seeds in a low humidity chamber (e.g., 20% relative humidity) at moderate temperatures (e.g., 25°–35°C) or drying the seeds by exposure to sunlight until the moisture contents come into a balance; normally the stabilized moisture contents of the various seeds will vary from around 3% up to about 11%, usually, however, about 5 to 9% moisture. These drying operations encourage the retention of viability by the seeds when placed in storage, and promote a higher percentage of germination after such storage. It has been found, however, that even after taking the abovedescribed steps, storage life of seeds is considerably less than desired. Efforts to improve storage life by reducing the moisture content of the seeds below the "normal" stabilization value usually requires more severe drying conditions. This can cause physical damage which may seriously injure the seed or kill it immediately. Such damage includes the cracking of the endosperm or cotyledons caused by rapid shrinkage of outer parts while the inner parts remain undried. A description of the known methods of drying seeds and their characteristics in storage is found in the treatise "Seed Biology", edited by T. T. Kozlowski, Volume III, "Insects, and Seed Collection, Storage, Testing and Certification", pp. 154–167; pp. 234–238; Academic Press (1972).

It has now been discovered that the process of freeze-drying seeds can reduce the moisture content of seeds below what is considered a normal stabilization value without causing tissue destruction and without destroying the viability of the seed to later germinate. There are, in addition, other surprising advantages provided by the practice of this invention. The freeze drying imparts significantly increased storage life to the seeds, which not only gives the obvious economic advantages of longer storage life, but also yields advantages in specialty uses, for example, in preparing seeds of vital primordial food crops to be stored as a contingency against natural attrition as well as destruction of crops from possible nuclear holocaust; making it possible for newly developed hybrid seeds to be stored for long range cross-breeding experiments; and storage of valuable ornamental seeds for safe keeping through long periods (some ornamental seeds are valued as high as thousands of dollars per ounce). An even more unexpected advantage of the invention derives from the discovery that some freeze dried seeds germinate more quickly than conventionally dried seeds. The invention thus fulfills the need in the agricultural field for adapting a seed to have a faster germination rate so that the plants (seedlings) will quickly gain a foot hold and be able to survive freezing weather or other adverse environmental conditions which would ordinarily kill tender seedlings but not destroy a plant which has undergone quicker growth. The faster germinating seeds produced by the practice of this invention are also a potential boon to those crops which have a shorter planting and harvesting period.

Accordingly, the process of this invention comprises the steps of reducing the moisture content of a seed by freeze-drying to thereby improve the storage life of the seed, placing said freeze-dried seed in storage, thereafter removing said seed from storage and causing the seed to be planted for germination of a plant therefrom.

It has been found additionally advantageous, in accordance with this invention, to first allow the harvested seed to attain a normally stabilized moisture content and thereafter freeze-dry the seed. Normally stabilized moisture content of the seed, as has previously been explained, varies depending on the original water content of a particular seed and is attained, for example, by holding the seeds in a low humidity chamber at moderate temperatures, or by exposure of the seed to sunlight until the moisture content comes into balance or becomes stabilized. When stabilized, the moisture content of the seed will ordinarily remain constant under conventional storage conditions. Such procedures for causing the seed to attain a normally stabilized moisture content to improve its storage life have been practiced commercially.

As mentioned previously the process of this invention is applicable to the freeze-drying of vegetable, farm-crop, and flower seeds of all varieties, including, but not limited to, the seeds of onion, parsley, pepper, eggplant, cucumber, beans, peas, tomatoes, sweet pea, stringless bean, lettuce, parsnip, corn, okra, cantalope, wheat, barley, oats, soybean, cabbage, Aquileagia, Aster, Poppy, Delphinium, Larkspur, Marigold, Salvia, Snapdragon and Zinnia.

In the "freeze drying" operation the seeds may be subjected to either "normal freezing" or "rapid freezing" preparation. In "normal freezing" the seeds are charged into trays which are placed in contact with shelves at ambient temperature which are then cooled or placed directly onto the cold (about −10° to −20°C) shelves of the freeze dryer until they reach the shelf temperature. In "rapid freezing" the seeds are contacted with liquid air or liquid nitrogen, and then charged to the freeze-dryer. Then, in accordance with conventional freeze-drying techniques, the frozen seeds are subjected to gentle heat, under suitable vacuum, to effect separation of moisture from the seeds by sublimation. Reduced pressures in the freeze-dryer on the order of $10^{-6}$ to 4 mm. Hg absolute may be employed, and generally the greater vacuum are preferred, i.e., pressure in the range of $10^{-6}$ to 0.5 mm. Hg abs. The transition from solid water to gaseous water by sublimation is endothermic, and energy must be supplied to effect the transition. As long as the chamber is maintained at a pressure lower than the vapor pressure of the frozen water, sublimation will cool the sample and prevent melting of the ice. Vacuum freeze drying equipment suitably adapted for the process embodied herein is commercially available.

The exemplary freeze-drying of seeds described hereinbelow to confirm the unexpected results of the invention were carried out using a Stokes Model 6P Freeze Dryer (product of Stokes Division, Pennwalt Corporation). Some typical results demonstrating how freeze-drying can result in a reduction of moisture content in commercially-dried seeds (seed having normally stabilized moisture content) even below that normally present in such seeds are given in Table I. All of the freeze-dried seeds showed good vigor and gave excellent germination on a percentage basis.

Table I

Residual Moisture Content of Representative Freeze Dried Seeds

| Seed | % Moisture in Commercial Seeds | % Moisture after Freeze Drying Commercial Seeds |
| --- | --- | --- |
| Pepper | 6.5 | 2.3 |
| Tomato | 4.6 | 2.3 |
| Eggplant | 7.2 | 2.7 |
| Snapdragon | 2.9 | 1.7 |

Moisture levels of the seeds involved in the tests embodied herein were reduced from about 8%–10% to from about 1 to 5% (by weight) using the freeze-drying technique. The net weight moisture content of seeds in the described examples is determined by measuring the volatiles lost from a representative selection taken from a sufficient sample of a particular seed specimen after exposure in an air oven at 100°C for 16 to 24 hours. Germination percentage is determined according to the methods recommended in "Rules for Testing Seeds of the Association of Official Seed Analysts", Vol. 60, No. 2 (1970). In seed laboratory practice, germination is officially defined as the emergence and development from the seed embryo of those essential structures which, for the type of seed being evaluated, are indicative of the ability to produce a normal plant under favorable conditions.

Samples of representative seeds known to have relatively short storage life and which had been freeze dried as above described, together with samples of control sample seeds which had not been freeze dried, were stored at the somewhat elevated temperature of 50°C to provide an accelerated aging test wherein storage at this relatively high temperature is extrapolatable into storage characteristics for longer periods at lower, ambient temperatures. The following data (Table 2) demonstrates the beneficial affects of freeze-drying on the viability of the seeds during storage, as measured by percent germination.

Table 2

| Seed | Initially | | Percent Germination After Three Months Storage at 50°C | | After Six Months Storage at 50°C | |
| --- | --- | --- | --- | --- | --- | --- |
| | Freeze-Dried | Control | Freeze-Dried | Control | Freeze-Dried | Control |
| Onion | 83% | 85% | 77% | 2.5% | 66% | 0 |
| Parsley | 79% | 82% | 83% | 42% | 82% | 0 |
| Pepper | 98% | 96% | 96% | 0 | 81% | 0 |

The following data (Table 3) on freeze-dried pepper seeds shows the surprising increase in speed of germination for such seeds compared to pepper seeds which had not been freeze dried. The percent germination six days subsequent to planting is particularly noteworthy.

Table 3

| Days after Planting | Percent Germination after Storage for Three Months at 21–25°C | |
| --- | --- | --- |
| | Control | Freeze Dried |
| 3 days | 3 | 6 |
| 6 days | 37 | 59 |
| 8 days | 75 | 85 |
| 10 days | 82 | 88 |
| 14 days | 95 | 98 |

I claim:

1. A process for preparing seeds for planting which comprises freeze drying the seeds to decrease their moisture content below the normally stabilized moisture content thereof and to increase the viability of the treated seeds during storage, and then placing the freeze dried seeds in storage.

2. A mass of stored, dried plant seeds capable of germination when planted, said seeds having been prepared in accordance with the process of claim 1.

3. The process of claim 1, further comprising removing said seeds from storage and planting same.

4. The process of claim 1 wherein prior to freeze drying, the seed has attained a normally stabilized moisture content.

5. The process of claim 4 wherein the seeds are dried to a normally stabilized moisture content ranging from 5 to 9 percent moisture.

6. A mass of stored, dried plant seeds capable of germination when planted, said seeds having been prepared in accordance with the process of claim 5.

7. The process of claim 4 wherein the seeds are further dried by freeze drying to a moisture content of from about 1 to 5 percent.

8. A mass of stored, dried plant seeds capable of germination when planted, said seeds having been prepared in accordance with the process of claim 7.

9. The process of claim 4 wherein the freeze drying is carried out by the normal freezing procedure.

10. The process of claim 4 wherein the seeds are selected from the class consisting of the seeds of onion, parsley, pepper, eggplant, cucumber, beans, peas, tomatoes, sweet pea, stringless bean, lettuce, parsnip, corn, okra, cantalope, wheat, barley, oats, soybean, cabbage, aquilegia, aster, poppy, delphinium, larkspur, marigold, salvia, snapdragon and zinnia.

11. A mass of stored, dried plant seeds capable of germination when planted, said seeds having been prepared in accordance with the process of claim 4.

12. The process of claim 4, further comprising removing said seeds from storage and planting same.

* * * * *